J. Simpson,
Horse Power.
Nº 12,731.      Patented Apr. 17, 1855.
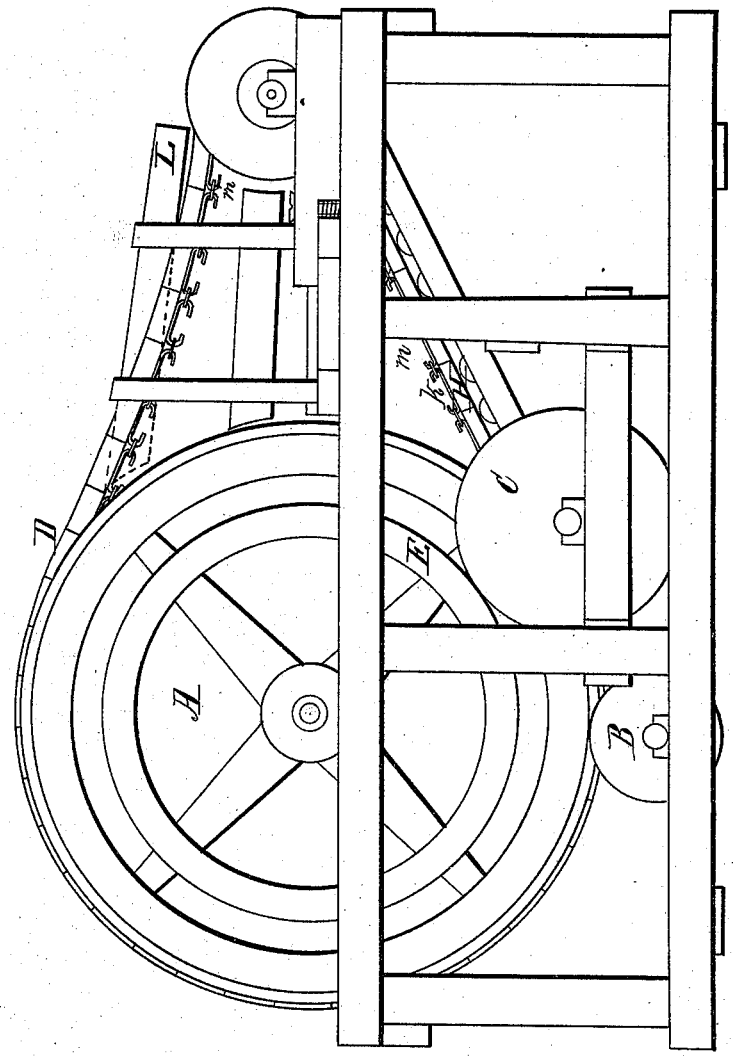

UNITED STATES PATENT OFFICE.

JOHN SIMPSON, OF ATLANTA, GEORGIA.

HORSEPOWER.

Specification of Letters Patent No. 12,731, dated April 17, 1855.

*To all whom it may concern:*

Be it known that I, JOHN SIMPSON, of Atlanta, in the county of Fulton and State of Georgia, have invented an Improvement in Horsepowers, and that the following is a full, clear, and exact description of the principle or character which distinguishes it from all other things before known and of the usual manner of making, modifying, and using the same, reference being had to the accompanying drawings.

My invention is an improvement in horse powers with a view to simplify and cheapen their construction and to render them efficient in using the power of the horse to the fullest and best advantage.

Horse powers are usually expensive machines and as they are ordinarily made to run with gearing, their use by farmers is very limited, for the reason that they have not the means at hand to repair or replace gear wheels if they get broken. I have designed my horse power with a view of dispensing with gearing altogether and have rendered the whole construction so simple that the farmer cannot only repair it at home but with an ordinary workman can make one for himself. I dispense with gearing altogether and communicate the power by friction alone. For this purpose I have adopted a peculiar arrangement of the main driving wheel and in combination therewith a suspension band for the tread of the horse so that their weight in addition to the weight of the driving wheel is brought to bear so as to produce the required friction between the driving wheel and the driving pulley. The main driving wheel A is used without any central bearing and is kept in place merely by the pulleys B, C, and the suspension band D. The driving wheel rests upon the driving pulley B and the rim E on the side of the driving wheel bears upon the check pulley. The object of this check pulley is to throw the foot of the wheel back as the wheel is drawn or presses forward by the action of the horses upon the suspension band D. The planks H, H, of this band are laid across and riveted to two, three, or more parallel rows of iron straps K, K. These straps are bent or hooked at each end and linked together by iron rings $m, m$, as shown in the drawings.

L L are railings to keep the horses from running or falling off the tread. It is common in horse powers to support the band or tread upon antifriction rollers but it is obvious that such an arrangement would not answer with a driving wheel without central bearings like mine. When the horses are upon the suspension band their weight brings it to a high degree of tension and produces friction between the driving wheel and driving pulley in addition to the weight of the driving wheel. The lower or returning part of the suspension band runs on friction pulleys as shown at $m$. Thus it will be seen that the construction of the whole machine is simple, cheap, and not liable to get out of order and is such, that an ordinary carpenter and blacksmith, or even the former alone could construct one, while at the same time it presents a very efficient and economical horse power.

I do not claim a driving wheel without central shaft or bearings, but

What I claim as my improvement in horse powers, is,

1. The employment of the large or main vertical driving wheel without central bearings in combination with the suspension band in the manner and for the purposes herein set forth.

2. I claim in combination with the driving wheel without central bearings and the suspension band, the inner rim $k$ and the pulley $m$ so arranged as to throw the foot of the driving wheel back, all in the manner herein set forth.

JOHN SIMPSON.

Witnesses:
T. CAMPBELL,
R. I. FALCONER.